Patented May 13, 1930

1,758,641

UNITED STATES PATENT OFFICE

GEORGE BARSKY, OF NEW YORK, N. Y., AND PALMER W. GRIFFITH, OF ELIZABETH, NEW JERSEY, ASSIGNORS TO AMERICAN CYANAMID COMPANY, OF NEW YORK, N. Y., A CORPORATION OF MAINE

PROCESS OF PRODUCING UREA

No Drawing. Application filed February 8, 1924. Serial No. 691,479.

This invention relates to a process of producing urea and has for its object to provide a procedure which will be simple to carry out and more efficient in practice than those which have been heretofore proposed.

With these and other objects in view the invention consists in the novel steps and combinations of steps constituting the process, all as will be more fully hereinafter disclosed and particularly pointed out in the claims.

In order that the invention may be the more clearly understood it is said:—It is well known that water and cyanamid $H_2CN_2$ may react to form urea and it is further well known that this reaction is greatly accelerated by the presence of acids.

These accelerating acids have usually been employed however, in considerable amounts because of the fact that the urea solutions so produced were more stable in strong or concentrated acid solutions than in dilute acid solutions. On the other hand, it is further well known that the use of large amounts of acid is undesirable not only because of the cost of the acid, but also because the yields in such cases are contaminated with impurities.

In a copending application, by one of the present applicants, George Barsky, Sr. No. 644,501, filed June 9, 1923, which has matured into Patent No. 1,618,504 dated Feb. 22, 1927, and entitled Process of making dicyandiamid, it has been disclosed that cyanamid solutions are polymerized to dicyandiamid compounds at hydrogen ion concentrations which are less than $10^{-8}$ normal. Furthermore, the present applicants in a copending application of even date herewith entitled Process of producing cyanamid, Ser. No. 691,478, which has matured into Patent No. 1,741,674 dated Dec. 31, 1929, have further disclosed that between the limits of hydrogen ion concentrations of $10^{-8}$ normal and $10^{-2}$ normal, cyanamid solutions are so stable that they may be stored for long periods or they may be concentrated in vacuo without suffering decomposition.

In this invention, on the other hand, we have discovered that cyanamid solutions whose hydrogen ion concentrations are between say $10^{-2}$ normal and $10^{-1}$ normal, or higher, are capable of a substantially complete conversion of their cyanamid content to urea. As the hydrogen ion concentration is increased the velocity of the reaction also increases and at a rate in proportion to the increase of the said hydrogen ion concentration.

Our discovery that cyanamid $H_2CN_2$ may be thus converted to urea at hydrogen ion concentrations as low as $10^{-1}$ normal, is of value because it enables one to employ much smaller quantities of acid than have been thought possible heretofore. A plausible explanation of the failure of previous workers to discover that such low acid concentrations may be employed probably resides in the fact that prior workers have conducted their experiments at temperatures sufficiently high to cause a proportion of the urea formed to decompose. For when such decomposition takes place the ammonia thus produced by this urea decomposition neutralizes the acid present and slows down and finally stops the urea transformation. To avoid such decomposition and neutralization we work at temperatures below 80° C. and prefer to work at temperatures not exceeding say 60° C. to 70° C., and at the same time we prefer to maintain the hydrogen ion concentration throughout the procedure at a point not substantially more than say $10^{-1}$ normal, by further additions of acid if required.

The following is given as an example of our process:—

We add to a solution of cyanamid, $H_2CN_2$, a quantity of acid and we heat this solution under certain conditions until the desired urea is produced.

That is to say, we prefer to prepare a solution of cyanamid, $H_2CN_2$, in accordance with the disclosure of our above identified copending application of even date herewith entitled, Process of producing cyanamid.

In this said copending application, crude calcium cyanamid is dissolved in water, the solution is treated with an acid such as $H_2SO_4$ in quantities sufficient to produce in the solution hydrogen ion concentrations between $10^{-8}$ normal and $10^{-2}$ normal and said concentrations are maintained between these limits.

The solution containing the cyanamid is sparated from any impurities present and contains substantially pure cyanamid free from decomposition products. This said cyanamid solution is suitable for carrying out the process of this application and to said solution we add sufficient acid capable of producing hydrogen ions to increase the hydrogen ion concentration in said solution to a degree greater than $10^{-2}$ normal. We may use any of the acidic reagents mentioned in our said copending application, such as acetic acid, hydrochloric acid, acid anhydrides or acid salts, but prefer to employ sulphuric acid. When $H_2SO_4$ is employed, with the above mentioned solution, we prefer to use a 5% aqueous solution of said acid. We next heat the cyanamid solution thus prepared and mixed with the acid to a temperature of about 60° C., and maintain it at that temperature until practically all of the cyanamid present has been converted into urea. The progress of the reaction should be followed by testing the solution from time to time with silver nitrate and ammonia and adjusting the hydrogen ion concentration to a point above $10^{-2}$ normal. That is, measurements of the hydrogen ion concentrations are made at convenient intervals, and further quantities of acid are added whenever said concentration falls below a predetermined point or say below $10^{-1}$ normal. The reaction will be found to be complete when the silver nitrate and ammonia tests no longer give a yellow precipitate of silver cyanamid. When the transformation is complete, the acid is neutralized and the area recovered by any convenient method, such as a concentration in vacuo.

After the urea has been thus formed it is desirable to neutralize the acid to form a precipitate to facilitate the recovery of the urea in a commercially pure state.

For the neutralization of the acid one may employ any alkaline reagent, for example, calcium or sodium carbonate. Ammonia may also be produced in the mixture itself by raising the temperature of the reaction mixture sufficiently to cause some urea decomposition whereupon the resulting ammonia will neutralize the acid.

This latter method is convenient because it requires the addition of no other chemical reagent, and it is not expensive, on account of the small amount of acid to be neutralized and the small amount of urea decomposed. The solution of urea thus produced may be further worked up for the production of solid urea by concentration, preferably in vacuo and by the recovery of the solid urea by crystallization or in a spray drier.

It will now be clear that by proceeding in the manner above disclosed one is enabled by this invention to produce urea from cyanamid by the use of smaller quantities of acid than have heretofore been thought possible, and this result is accomplished by adjusting and maintaining the hydrogen ion concentrations to points not lower than $10^{-2}$ normal and not higher than say $10^{-1}$ normal, or $10^{-0.7}$ normal.

The degree of hydrogen ion concentration is expressed herein in terms of normality, indicating that the amount of hydrogen ions is a certain fractional part of the normal solution, one gram per liter, of hydrogen ions. Thus a "$10^{-1}$ normal" solution is 0.1 normal and it signifies the presence of 0.1 grams of hydrogen as hydrogen ions in one liter of solution.

It is obvious that those skilled in the art may vary the details of the procedure without departing from the spirit of the invention, and therefore, we do not wish to be limited to the above disclosure except as may be required by the claims.

What is claimed is:—

1. The process of producing urea from cyanamid which comprises making a solution of cyanamid; adjusting and maintaining the hydrogen ion concentration of the solution to not more than $10^{-1}$ normal; and heating said solution to a point below 80° C. until substantially all the cyanamid is converted to urea.

2. The process of producing urea from cyanamid which comprises making a solution of cyanamid; adjusting and maintaining the hydrogen ion concentration of the solution to not more than $10^{-0.7}$ normal and heating said solution below 70° C. until substantially all the cyanamid is converted to urea.

3. The process of producing urea from cyanamid which comprises making a solution of cyanamid; adjusting and maintaining the hydrogen ion concentration of the solution to not less than $10^{-2}$ normal and not greater than $10^{-0.7}$ normal and heating said solution below 65° C. until substantially all the cyanamid is converted to urea.

4. The process for the production of urea from cyanamid comprising making a solution of cyanamid; adjusting and maintaining the hydrogen ion concentration of the solution to not less than $10^{-2}$ normal and not greater than $10^{-0.7}$ normal; and heating said solution below 60° C. until substantially all the cyanamid is converted to urea.

5. The method of producing urea which comprises providing an acid solution of cyanamid; adjusting the hydrogen ion concentration of said solution to a value between $10^{-2}$ normal and $10^{-0.7}$ normal; heating said solution below 60° C. and simultaneously maintaining the hydrogen ion concentration of said solution between $10^{-2}$ normal and $10^{-0.7}$ normal until the transformation of the cyanamid to urea is substantially complete;

neutralizing the acid; and recovering the urea.

6. The method of producing urea which comprises extracting crude calcium cyanamid with water; filtering the mixture thus obtained; acidifying said mixture; adjusting the hydrogen ion concentration of the extract to a value between $10^{-1}$ normal and $10^{-2}$ normal; heating said extract below 60° C. and simultaneously maintaining the hydrogen ion concentration of said extract between $10^{-0.7}$ normal and $10^{-2}$ until the transformation of the cyanamid to urea is substantially complete; neutralizing the acid present; and recovering the urea formed.

In testimony whereof we affix our signatures.

GEORGE BARSKY.
PALMER W. GRIFFITH.